United States Patent
Yagüe Hernánz et al.

(10) Patent No.: US 11,173,831 B2
(45) Date of Patent: Nov. 16, 2021

(54) SPECIFIC SIGNALLING SYSTEM TO WARN ROAD USERS OF THE IMMINENT OPENING OF VEHICLE DOORS

(71) Applicants: Ricardo Yagüe Hernánz, Madrid (ES); Maria Nieves Yagüe Hernánz, Madrid (ES)

(72) Inventors: Ricardo Yagüe Hernánz, Madrid (ES); Maria Nieves Yagüe Hernánz, Madrid (ES)

( * ) Notice: Subject to any disclaimer, the term of this patent is extended or adjusted under 35 U.S.C. 154(b) by 0 days.

(21) Appl. No.: 16/650,093

(22) PCT Filed: Aug. 13, 2018

(86) PCT No.: PCT/ES2018/000065
§ 371 (c)(1),
(2) Date: Mar. 24, 2020

(87) PCT Pub. No.: WO2019/063857
PCT Pub. Date: Apr. 4, 2019

(65) Prior Publication Data
US 2020/0223353 A1   Jul. 16, 2020

(30) Foreign Application Priority Data
Sep. 26, 2017 (ES) .............................. ES201700652U

(51) Int. Cl.
*B60Q 1/50* (2006.01)
*B60Q 1/26* (2006.01)
*B60R 22/48* (2006.01)

(52) U.S. Cl.
CPC ............. *B60Q 1/50* (2013.01); *B60Q 1/2665* (2013.01); *B60R 22/48* (2013.01); *B60R 2022/4816* (2013.01); *B60R 2022/4875* (2013.01)

(58) Field of Classification Search
CPC ........ B60Q 1/50; B60Q 3/258; B60R 1/2665; B60R 1/02; B60R 1/1207; B60R 22/48
(Continued)

(56) References Cited

U.S. PATENT DOCUMENTS

| | | | |
|---|---|---|---|
| 6,264,353 B1 * | 7/2001 | Caraher | B60Q 1/2665 340/475 |
| 9,744,903 B2 * | 8/2017 | Malone | B60Q 1/525 |

(Continued)

FOREIGN PATENT DOCUMENTS

| | | | | |
|---|---|---|---|---|
| DE | 10330923 | * | 2/2005 | ........... B60Q 1/2665 |
| DE | 10330923 A1 | | 2/2005 | |
| DE | 102005039984 A1 | | 5/2007 | |

OTHER PUBLICATIONS

International Search Report issued in PCT/ES2018/000065 dated Mar. 4, 2019.

*Primary Examiner* — Omer S Khan
(74) *Attorney, Agent, or Firm* — Heslin Rothenberg Farley & Mesiti PC; Kristian E. Ziegler, Esq.

(57) ABSTRACT

Signaling system for vehicles, specific to warn the rest of users of the road that the opening any of the doors of the vehicle is going to occur imminently, before this opening occurs, which is achieved in the first place, with the installation around the outside mirrors of the vehicle of a set of powerful flashing lights (2R/2N), completely surrounding said mirrors by the mirror part, warning lights that will be oriented to be seen horizontally, and to the exterior of the vehicle so as to be easily seen by the users of the road and at the same time not to bother the driver. And second, this set of warning lights are connected to presence sensors installed on each of the interior handles of the vehicle doors that will allow detect the hand before it touches any of the interiors handles or concrete system of opening the doors, when the occupants are ready to operate them to open and exit, (Continued)

thereby gaining an essential time that does not exist until now.

7 Claims, 2 Drawing Sheets

(58) Field of Classification Search
USPC .................................. 340/461, 468, 471
See application file for complete search history.

(56) References Cited

U.S. PATENT DOCUMENTS

| | | | |
|---|---|---|---|
| 9,821,743 B2 * | 11/2017 | Zhang | B60Q 1/525 |
| 9,840,191 B1 * | 12/2017 | Salter | B60Q 1/2665 |
| 2003/0151504 A1 | 8/2003 | Chang | |
| 2012/0194356 A1 * | 8/2012 | Haines | B60Q 1/323 |
| | | | 340/933 |
| 2016/0208537 A1 | 7/2016 | Senguttuvan et al. | |
| 2017/0028907 A1 | 2/2017 | Chen | |
| 2017/0210282 A1 * | 7/2017 | Rodriguez Barros | B60Q 1/484 |

* cited by examiner

SPECIFIC SIGNALLING SYSTEM TO WARN ROAD USERS OF THE IMMINENT OPENING OF VEHICLE DOORS

CROSS REFERENCE TO RELATED APPLICATIONS

This application is a U.S. National Phase filing under 35 U.S.C. § 371 of International Application PCT/ES2018/000065, filed Aug. 13, 2018. PCT/ES2018/000065 claims priority from Spanish application number 0201700652, filed Sep. 26, 2017 and granted a patent on Feb. 1, 2018 as Spanish Patent No. ES1198411Y. The entire contents of each of these applications are hereby expressly incorporated herein by reference.

SECTOR OF THE TECHNIQUE

This invention pertains to the automotive sector and the safety of the moving traffic, in particular it is a signalling system of the vehicle for road traffic safety and the vehicles in which it is installed and their occupants.

The object of this invention is therefore a signalling system installed in the vehicle, in particular in the exterior rear view mirrors, and connected to these, in the handles or shooters interiors of the vehicle doors, with the particularity and for the purpose of allowing alert with the sufficient advance notice to the rest of users travelling on the track, that the imminent opening of the vehicle doors will occur, and this before said opening is produced.

BACKGROUND OF THE INVENTION

Vehicle manufacturers are increasingly including more warning and indicator lights on vehicles for the benefit of other road users in addition to the usual indicator, brake and hazard lights to warn of direction changes, unexpected braking or breakdowns, etc. These lights are included in cars as part of their aesthetics and design, so much so that, today, it is common to see them installed on wing mirrors as aesthetic elements or as driver warning lights for blind spots, etc.

However there is currently, no signalling system in vehicles exists to specifically warn other road users (whether cars, motorcycles, industrial vehicles or simple passers-by, etc.) of the previous moment in which the doors of a vehicle open by its occupants, whether the front or rear doors, with the logical invasion of the road that this causes and the potential risk that this act involves.

The existence of such a signalling system is therefore necessary to warn other road users in advance of the imminent opening of vehicle doors by occupants in order to give them sufficient reaction time, which they currently lack, and thus prevent accidents due to the unexpected opening of vehicle doors, concrete problem to which this signalling system provides a specific solution.

Because unlike some requests of patents that describe a multitude of laser lights and auxiliary lights placed in the vehicle, or on wing mirrors, and orientated downwards which project signals and light patterns on the ground to indicate situations or events, such as the size of the door when it opens, the area where the door opens, reversing, etc., which, because they are projections on the ground, have little visibility for traffic, and, when they refer to sensors, they do not specify the type nor the moment of activation, This invention is a specific and concrete signalling system to warn of inequivocal form to other road users of the imminent opening of any of the vehicle's doors by its occupants, and this before said opening is produced, and this is made possible thanks to some sensors volumetric or infrared installed in each of the interior handles of doors, that they detect the hand before touches the any of the interior handles of doors to operate them to open the door and exit, thereby providing essential time that does not currently exist, time during which the powerful and flashing exterior warning lights will have been on, which will be activated by the sensors to which they are connected, and that they will be easily distinguishable by the rest of the users that circulate or walk along the track in the direction of the march, since they are installed around the two exterior mirrors of the vehicle, so that when emitting the light beams they will have an orientation to be seen horizontally and from the height at which the external rear view mirrors are normally located in the vehicles, said lights are visible at a long distance, and therefore distinguishable by the road users at a distance equal to and even greater than that of the other vehicle signalling lights such as turn signals, brake lights and the rest of indicator lights, integrating with them but at the same time differentiating perfectly from the rest of the indicator lights of the vehicle.

EXPLANATION OF THE INVENTION

The inventor of this application has therefore developed a new and effective system to avoid traffic accidents caused by the unexpected opening of vehicle doors, thanks to the installation in such vehicles of a system comprising the placement in the exterior rear-view mirrors of the vehicle of a set of powerful lights, oriented towards the exterior of the vehicle and emitting their light to be seen horizontally (not downwards) so that they perform their function and at the same time do not disturb the driver, set of warning lights that will be activated when the occupants of the vehicle approach the hand to operate the handles or handles of the doors to open them, which will be achieved with a series of active sensors that detect the presence of the hand before touching the corresponding handle, which is achieved by a volumetric sensor device or of photoelectric beams of light, infrared, or the most appropriate type. This connection between the mirrors and the interior door handles can be carried out by means of a connector that will activate the lights that are installed around the mirror corresponding to the side of the vehicle in which the approach of the hand is detected before touching the handle to open the door.

This safety system will always be active in the vehicle, either with the engine on or off, but does not come into operation until the vehicle is stopped, and with the seat belts unfastened, the moment at which the occupants are usually preparing to open the doors to leave.

BRIEF DESCRIPTION OF THE DRAWINGS

To complete the description that is being made and in order to help a better understanding of the characteristics of the invention, is accompanied as an integral part of it, a set of drawings where illustrative and not limitative, is represented as follows.

PREFERENTIAL REALIZATION OF THE INVENTION

Figure 1:
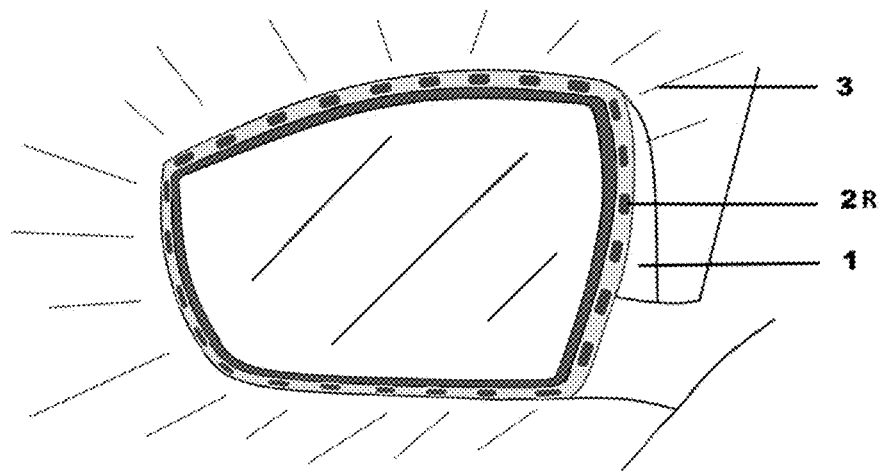
FIG. 1 shows an example of a rear-view mirror of a vehicle with the light warning system installed bordering the rearview mirror on the side of the mirror FIGS. 2a and 2b respectively show an interior vehicle door handle without the system and with the sensor warning system installed.
Figure 2A:
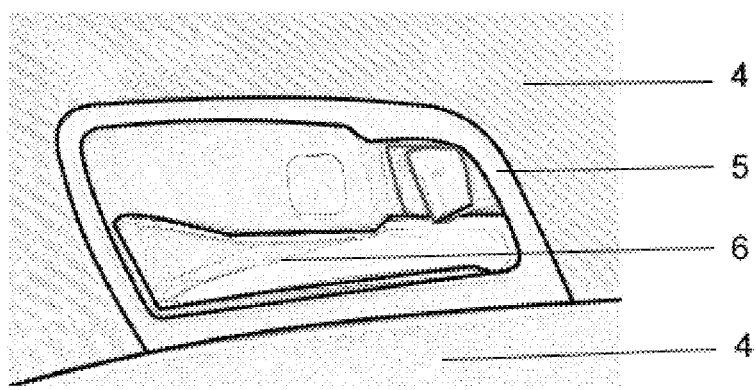
Figure 2B:
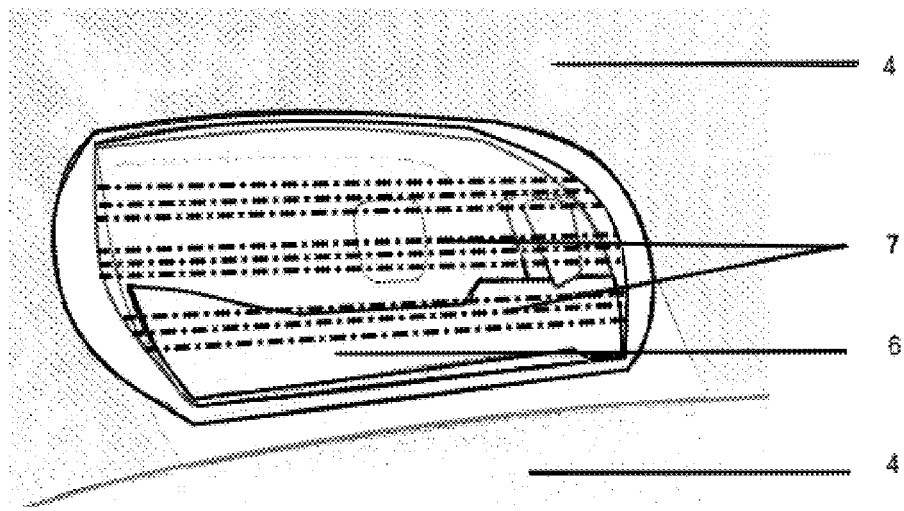

Below is described an example of installation in a vehicle the signalling system invented to warn other road users of the imminent opening of any of the doors of the vehicle before such opening occurs, and for this purpose one of the parts of the installation consists of placing around the exterior rear-view mirrors of the vehicle a set of powerful flashing lights (2R and 2N), surrounding in its totality the same ones by the part of the mirror, lights that depending on the model of each vehicle can be placed either bordering (2R) these exterior mirrors (1) of the vehicle by the part of the mirror, or they can be installed in the space that exists between the housing of the mirror and the mirror itself (2N), and in both cases always around all the perimeter of the same ones. This set of lights shall be directed towards the outside of the vehicle to fulfil its purpose of unequivocally alerting the other users that the doors are about to be opened, for this purpose they shall have a suitable inclination to be seen horizontally outside, by the other road users without disturbing the driver of the vehicle, in such a way that they project their light horizontally over a long distance (neither downwards nor towards the ground), which can be achieved by, among other means, the angle at which this set of lights is placed in the rear-view mirror (1), also adapting to the design and model of each vehicle.

Likewise, the set of lights (2R/2N) installed on the outside of the vehicle, and more specifically on the exterior mirrors (1), must be capable of fulfilling their function with high luminosity (3), so that even during the day, their operation can be perfectly appreciated. This is achieved by regulating the intensity that passes through them, which will depend on the characteristics of the particular type of lighting, as well as the characteristics of the vehicle in which it is installed.

The second part of the installation of the system consists of placing in the mechanism of interior opening of the doors (which is normally the one that conforms the interior handles (5), and where there are also the locks and the buttons of the window lifters among others, the handles (6) of opening of each door (4) of the vehicle, both front and rear, active sensors (7) volumetric, or photoelectric beams or light barriers, or infrared, installed in each of the interior handles (5) of the doors, that detect the hand before touching any of the handles (6) of these interior handles (5) of the doors (4) to open them.

The system is completed with the connection of both parts, i.e. the interior handles (5) of the doors (4) or specific mechanism available to the vehicle for the opening of the same, with the vehicle's external illumination warning system (2R/2N), i.e. the sensors (7) of the interior handles (5) of all the vehicle doors will be connected to the set of lights installed around the rear-view mirrors (1), in such a way that when any of the sensors (7) installed in the interior door handles detect the hand before it touches the handles (6) that form part of the set of these interior handles (5), to operate them and open the doors to exit, immediately activate the warning lights of the rear-view mirror on the side of the vehicle corresponding to the door (4) to be opened, either front or rear.

And all this sufficiently in advance so that the function and objective of this system is fulfilled, which is none other than that before any door (4) of the vehicle is opened by its occupants, the rest of the road users know in advance that this is going to happen, because previously and for a sufficient time they have been warned by the powerful flashing lights (2R/2N) of the corresponding rear-view mirror (1) on the side of the vehicle whose door, either front or rear, is going to open, thus avoiding the accidents that by the unexpected opening of the doors are occurring.

Figure 3:
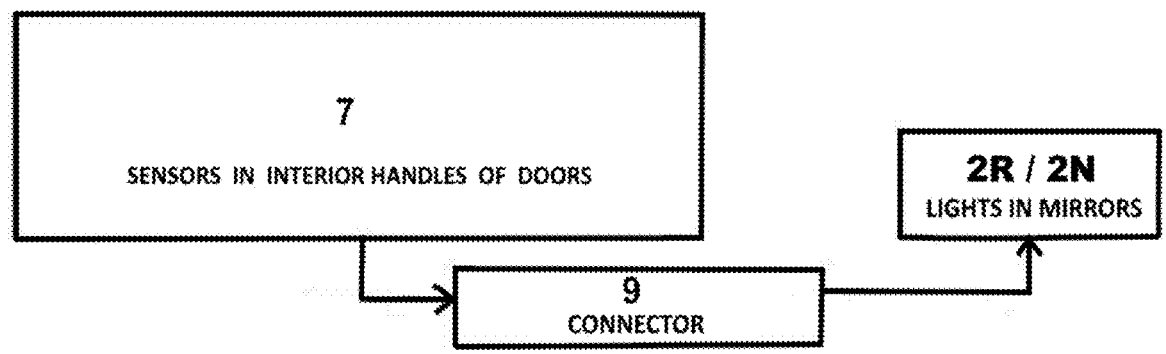
FIG. 3 represents a diagram of the possible connection of the essential parts that make up the system.
Figure 4:
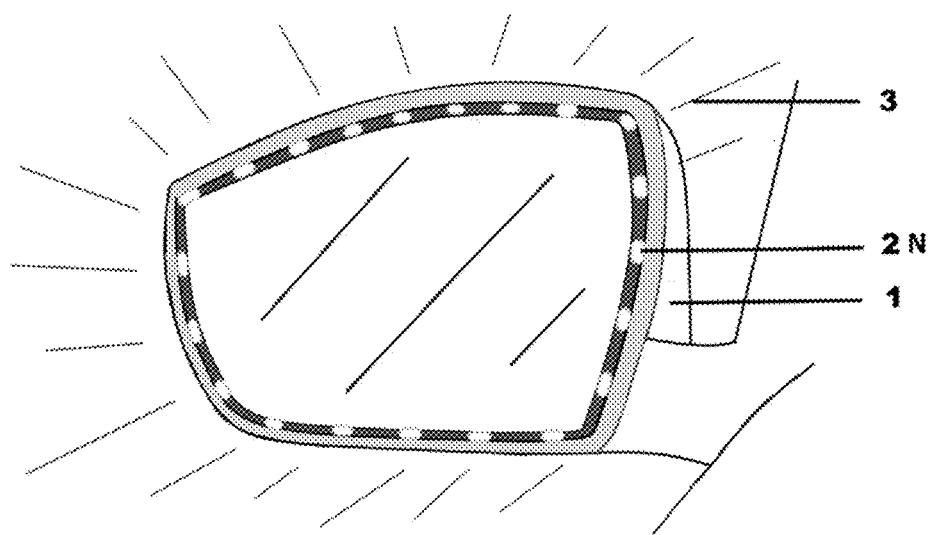
FIG. 4 shows an example of a rear-view mirror of a vehicle with the light warning system installed around the space that exists between the housing and the mirror.

For the connection of the two essential parts of the system can be used for example a connector or a controller of the most appropriate type (9), which will be powered by the battery of the car and the corresponding transformer to achieve the proper voltage, and which will connect the four sensors (7) of the interior handles (5) of the doors (4) with the set of lights (2R/2N) of the mirrors (1), serve as an example the scheme in FIG. 3, although it can be carried out by any other method. In the same way as the above-mentioned set of lights and handle sensors, other sensors of the most suitable type which detect on the one hand the stopping of the vehicle and, on the other hand, the moment in which one or both of the safety belts on one or both sides of the vehicle are unbuttoned, so that the signalling system does not come into operation until the vehicle is stationary, shall also be connected via the connector-controller, and with the safety belts unbuckled which as we have said is the time when its occupants are preparing to open the doors to leave, and thus prevents that even if those involuntarily approach the sensors of the interior handles during the march, at a traffic light or in any other situation, other than the time to go to open the door to get out of the vehicle, will not turn on the signal lights that warn that some of its doors are going to open.

The placement in the vehicle of the parts mentioned in the example to completely install the whole system does not necessarily have to keep the mentioned order, but the one that functionally is more suitable due to the characteristics of the vehicles and the adaptation of the installed system to each model and type of vehicle.

As reflected in the description of the invention, this safety warning system will always be active in the vehicle, either with the engine on or off, although it will not come into operation until the vehicle is stationary, and with the seat belts unbuckled, which is when its occupants are normally ready to open them to leave.

The unexpected opening of vehicle doors has always been a problem for road safety, causing accidents to cyclists, motorcyclists, other vehicles, and the occupants themselves. With this effective signalling system installed in vehicles, which serves specifically to warn the rest of the road users on the outside of the vehicle of such a basic and fundamental action as simply opening the doors and to leave, and which all occupants perform when travelling in vehicles, road safety is contributed to, and accidents are avoided for this reason.

For this reason, the present signalling system is not only susceptible to its application and installation in all types of vehicles with doors, such as passenger cars, vans, lorries, industrial vehicles, in vehicles dedicated to public service, etc., but also contributes directly to the road safety of the traffic, and of the vehicles themselves and their occupants, in which it is installed.

The invention claimed is:

1. A signalling system for a vehicle with safety belts and exterior rear-view mirrors on driver and passenger sides thereof to warn road users of an imminent opening of a driver or passenger side door of the vehicle before such opening occurs, the system comprising:

a set of a plurality of powerful warning lights installed around a perimeter of each of the exterior rear-view mirrors of the vehicle on a mirror side of the exterior rear-view mirrors, the sets of powerful warning lights being oriented to emit light horizontally in the direction of the road users, and not downwardly or towards the ground, and therefore seen by the road users spaced from the vehicle in the horizontal direction;

a plurality of presence sensors that are connected to the sets of powerful warning lights and are installed in interior handles of each of the doors, each presence sensor of the plurality of presence sensors being configured to detect a hand of an occupant of the vehicle before the hand touches an interior handle of the interior handles, and thereby before operation of the respective interior handle by the hand of the occupant to open the door associated with the interior handle and leave the vehicle; and a plurality of safety belt anchorage sensors connected to the plurality of presence sensors and the sets of powerful warning lights configured to detect unfastening of the safety belts, wherein the system is always active in the vehicle, and is configured such that when a first presence sensor, on a driver or passenger side, detects an approaching first hand of an occupant, and a first safety belt anchorage sensor associated with a safety belt on the same driver or passenger side as the first presence sensor detects that the safety belt becomes unfastened, the set of powerful warning lights associated with the exterior rear-view mirror on the same driver or passenger side of the vehicle as the first presence sensor that detected the first approaching hand is activated in a flashing mode to provide the warning to the road users of the imminent opening of a door of the vehicle on the respective driver or passenger side of the vehicle, and the set of powerful warning lights associated with the exterior rear-view mirror on the opposite driver or passenger side of the vehicle remain inactivated until a second presence sensor associated with said opposite driver or passenger side of the vehicle separately detects an approaching second hand and a second safety belt anchorage sensor associated with a safety belt on the opposite driver or passenger side detects that the safety belt becomes unfastened, wherein the sets of powerful warning lights only operate as door opening waring lights and are unassociated with any other signalling or indicator light of the vehicle, and wherein when the sets of powerful warning lights are activated, the sets of powerful warning lights emit at high luminosity and distinguishable by the road users at a distance in the horizontal direction equal to or greater than that of the other signalling or indicator lights of the vehicle.

2. The signalling system according to claim 1, wherein each set of the plurality of powerful warning lights are installed around a perimeter border of a mirror member of the mirrors towards the mirror side of the mirrors.

3. The signalling system according to claim 1, wherein each set of the powerful warning lights are installed within a space that exists between a housing of the exterior rear-view mirrors that houses a mirror member of the exterior rear-view mirrors and a periphery of the mirror member.

4. The signalling system according to claim 1, further comprising a vehicle motion sensor connected to the plurality of safety belt anchorage sensors, the plurality of presence sensors and the sets of powerful warning lights, and wherein the system is configured such that the sets of powerful warning lights become activated if the vehicle motion sensor further detects that the vehicle is stationary.

5. The signalling system according to claim 2, further comprising a vehicle motion sensor connected to the plurality of presence sensors and the sets of powerful warning lights, and wherein the system is configured such that the sets of powerful warning lights become activated only if the vehicle motion sensor further detects that the vehicle is stationary.

6. The signalling system according to claim 3, further comprising a vehicle motion sensor connected to the plurality of presence sensors and the sets of powerful warning lights, and wherein the system is configured such that the sets of powerful warning lights become activated only if the vehicle motion sensor further detects that the vehicle is stationary.

7. The signalling system according to claim 1, wherein presence sensors comprise volumetric or infrared sensors.

* * * * *

UNITED STATES PATENT AND TRADEMARK OFFICE
CERTIFICATE OF CORRECTION

PATENT NO. : 11,173,831 B2
APPLICATION NO. : 16/650093
DATED : November 16, 2021
INVENTOR(S) : Yague Hernanz et al.

Page 1 of 1

It is certified that error appears in the above-identified patent and that said Letters Patent is hereby corrected as shown below:

In the Claims

Column 6, Line 33: Claim 5, Delete "activated only if" and insert -- activated if --

Column 6, Line 40: Claim 6, Delete "activated only if" and insert -- activated if --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*